(12) United States Patent
Bouda (10) Patent No.: US 10,044,440 B2
(45) Date of Patent: Aug. 7, 2018

(54) NOISE MARGIN MONITOR AND CONTROL METHOD

(71) Applicant: Fujitsu Limited, Kawasaki-shi, Kanagawa (JP)

(72) Inventor: Martin Bouda, Plano, TX (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/296,661

(22) Filed: Oct. 18, 2016

(65) Prior Publication Data

US 2018/0109315 A1 Apr. 19, 2018

(51) Int. Cl.
*H04B 10/07* (2013.01)
*H04B 10/079* (2013.01)
*H04B 10/61* (2013.01)
*H04L 1/00* (2006.01)

(52) U.S. Cl.
CPC ....... *H04B 10/07953* (2013.01); *H04B 10/61* (2013.01); *H04L 1/0045* (2013.01)

(58) Field of Classification Search
CPC . H04B 10/079; H04B 10/07953; H04B 10/61
See application file for complete search history.

(56) References Cited

U.S. PATENT DOCUMENTS

| | | | |
|---|---|---|---|
| 2004/0015765 A1* | 1/2004 | Cooper | H03M 13/35 714/750 |
| 2004/0030965 A1* | 2/2004 | Hadjihassan | H04L 1/20 714/704 |
| 2016/0373187 A1* | 12/2016 | Oda | H04B 10/07953 |
| 2016/0380793 A1* | 12/2016 | Chen | H04L 27/26 370/329 |

* cited by examiner

*Primary Examiner* — Dzung Tran (74) *Attorney, Agent, or Firm* — Baker Botts L.L.P.

(57) ABSTRACT

Methods and systems are provided for monitoring a network link in an optical transport network. The method includes injecting a first level of added noise to the data stream at the receiver for a first period. The method further includes calculating a first bit error rate (BER) for the first period. The method also includes injecting a second level of added noise to the data stream at the receiver for a second period, the second level of added noise different than the first level of added noise, wherein the first and second periods do not overlap. The method further includes calculating a second BER for the second period. In addition, the method includes determining a characteristic of the network link based on the first BER and the second BER.

20 Claims, 3 Drawing Sheets

NOISE MARGIN MONITOR AND CONTROL METHOD

BACKGROUND

Field of the Disclosure

The present disclosure relates generally to optical communication networks and, more particularly, to systems and methods for monitoring and controlling noise margins in optical communication networks.

Description of the Related Art

Telecommunications systems, cable television systems and data communication networks use optical networks to rapidly convey large amounts of information between remote points. In an optical network, information is conveyed in the form of optical signals through optical fibers. Optical fibers may comprise thin strands of glass capable of communicating the signals over long distances. Optical networks may include various optical elements, such as amplifiers, dispersion compensators, multiplexer/demultiplexer filters, wavelength selective switches (WSS), optical switches, couplers, etc. to perform various operations within the network.

Noise within an optical network may corrupt the data transmission and affect the network's ability to reliably send and receive data via optical signals. For example, noise may cause bit errors, in which one or more bits of data from a transmitter are interpreted incorrectly at a receiver. Optical networks often employ techniques for detecting and correcting bit errors caused by network noise. However, such error correction techniques may cease to function when the bit error rate exceeds a particular threshold.

Noise in the network may vary over time due to changing network conditions and equipment. Thus, a noise margin may be used to ensure that the bit error rate remains below the bit error rate threshold. As the noise margin is increased, the less likely it becomes that an unrecoverable bit error will occur. However, an increased noise margin may limit the transmission distance and/or communication throughput of the network. Thus, it may be desirable to monitor the noise on the network over time in order to select the optimal noise margin based on the current network conditions.

SUMMARY

In particular embodiments, a method for monitoring a network link in an optical transport network includes injecting a first level of added noise to the data stream at the receiver for a first period. The method further includes calculating a first bit error rate (BER) for the first period. The method also includes injecting a second level of added noise to the data stream at the receiver for a second period, the second level of added noise different than the first level of added noise, wherein the first and second periods do not overlap. The method further includes calculating a second BER for the second period. In addition, the method includes determining a characteristic of the network link based on the first BER and the second BER In another embodiment, a receiver in an optical transport network includes a noise generator. The receiver also includes a controller coupled to the noise generator, the controller configured to direct the noise generator to inject a first level of added noise to a data stream for a first period, the data stream comprising data received over a network link. The controller is further configured to calculate a first bit error rate (BER) for the first period. The controller is also configured to direct the noise generator to inject a second level of added noise to the data stream for a second period, the second level of added noise different than the first level of added noise, wherein the first and second periods do not overlap. In addition, the controller is configured to calculate a second BER for the second period. The controller is also configured to determine a characteristic of the network link based on the first BER and the second BER.

In another embodiment, a method for monitoring a network link in an optical transport network includes injecting a first level of added noise to the data stream at the receiver for a first period. The method further includes calculating a first bit error rate (BER) for the first period. The method also includes injecting a second level of added noise to the data stream at the receiver for a second period, the second level of added noise different than the first level of added noise, wherein the first and second periods do not overlap. The method further includes calculating a second BER for a third period, the third period including the first and second period. The method also includes determining a characteristic of the network link based on the first BER and the second BER.

BRIEF DESCRIPTION OF THE DRAWINGS

For a more complete understanding of the present invention and its features and advantages, reference is now made to the following description, taken in conjunction with the accompanying drawings, in which.

DESCRIPTION OF THE EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Figure 1:
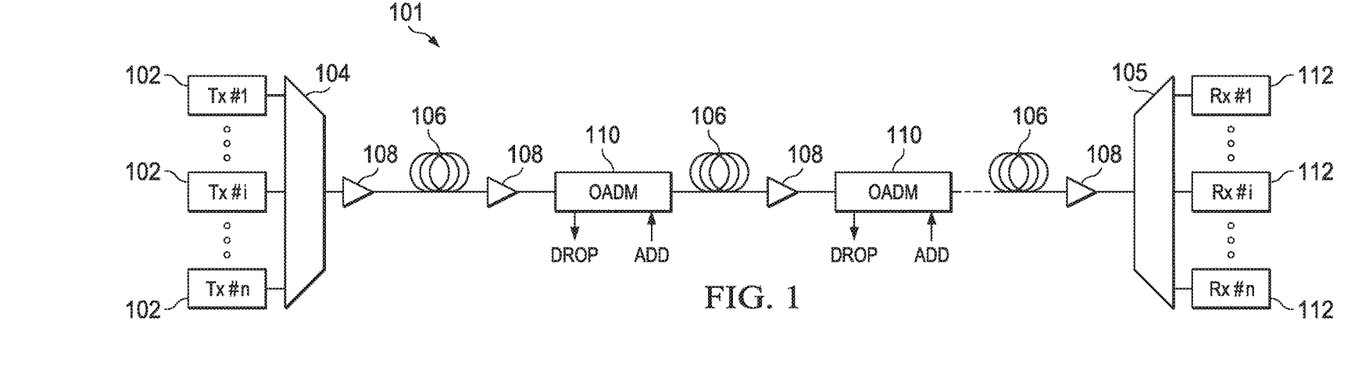
FIG. 1 illustrates a block diagram of selected elements of an embodiment of an optical transport network.

Referring now to the drawings, FIG. 1 illustrates an example embodiment of optical network 101, which may represent an optical communication system. Optical network 101 may include one or more optical fibers 106 to transport one or more optical signals communicated by components of optical network 101. The network elements of optical network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical network 101 may comprise a point-to-point optical network with terminal nodes, a ring optical network, a mesh optical network, or any other suitable optical network or combination of optical networks. Optical network 101 may be used in a short-haul metropolitan network, a long-haul inter-city network, or any other suitable network or combination of networks. The capacity of optical network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a Single-Mode Fiber (SMF), Enhanced Large Effective Area Fiber (E-LEAF), or TrueWave® Reduced Slope (TW-RS) fiber.

Optical network 101 may include devices to transmit optical signals over optical fibers 106. Information may be transmitted and received through optical network 101 by modulation of one or more wavelengths of light to encode the information on the wavelength. In optical networking, a wavelength of light may also be referred to as a channel that is included in an optical signal (also referred to herein as a "wavelength channel"). Each channel may carry a certain amount of information through optical network 101.

To increase the information capacity and transport capabilities of optical network 101, multiple signals transmitted at multiple channels may be combined into a single wideband optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical network 101 may transmit disparate channels using WDM or some other suitable multi-channel multiplexing technique, and to amplify the multi-channel signal.

Optical network 101 may include one or more optical transmitters (Tx) 102 to transmit optical signals through optical network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information included in the electrical signals onto a beam of light produced by the laser at a particular wavelength, and transmit the beam for carrying the signal throughout optical network 101.

Multiplexer 104 may be coupled to transmitters 102 and may be a system, apparatus or device to combine the signals transmitted by transmitters 102, for example, at respective individual wavelengths, into a WDM signal.

Optical amplifiers 108 may amplify the multi-channeled signals within optical network 101. Optical amplifiers 108 may be positioned before or after certain lengths of fiber 106. Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of an optical pump to excite the atoms of the doped portion of the optical fiber, which increases the intensity of the optical signal. As an example, optical amplifiers 108 may comprise an erbium-doped fiber amplifier (EDFA).

OADMs 110 may be coupled to optical network 101 via fibers 106. OADMs 110 comprise an add/drop module, which may include a system, apparatus or device to add and drop optical signals (for example at individual wavelengths) from fibers 106. After passing through an OADM 110, an optical signal may travel along fibers 106 directly to a destination, or the signal may be passed through one or more additional OADMs 110 and optical amplifiers 108 before reaching a destination.

In certain embodiments of optical network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not expressly illustrated) that may be included in a ROADM.

As shown in FIG. 1, optical network 101 may also include one or more demultiplexers 105 at one or more destinations of network 101. Demultiplexer 105 may comprise a system, apparatus or device that acts as a demultiplexer by splitting a single composite WDM signal into individual channels at respective wavelengths. For example, optical network 101 may transmit and carry a forty (40) channel DWDM signal. Demultiplexer 105 may divide the single, forty channel DWDM signal into forty separate signals according to the forty different channels.

As shown in FIG. 1, optical network 101 may also include receivers 112 coupled to demultiplexer 105. Each receiver 112 may receive optical signals transmitted at a particular wavelength or channel, and may process the optical signals to obtain (e.g., demodulate) the information (e.g., the data encoded for communication at transmitter 102) included in the optical signals. Accordingly, network 101 may include at least one receiver 112 for every channel of the network.

Optical networks, such as optical network 101 in FIG. 1, may employ modulation techniques to convey information in the optical signals over the optical fibers. Such modulation schemes may include phase-shift keying (PSK), frequency-shift keying (FSK), amplitude-shift keying (ASK), pulse-amplitude modulation (PAM), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

Additionally, polarization division multiplexing (PDM) technology may provide achievement of a greater bit rate for information transmission. PDM transmission comprises independently modulating information onto different polarization components of an optical signal associated with a channel. In this manner, each polarization component may carry a separate signal simultaneously with other polarization components, thereby enabling the bit rate to be increased according to the number of individual polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may include a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and an operational support system (OSS) which handles network-wide operations.

Modifications, additions or omissions may be made to optical network 101 without departing from the scope of the disclosure. For example, optical network 101 may include more or fewer elements than those depicted in FIG. 1. To illustrate, optical network 101 may include systems, apparatuses, or devices to perform signal regeneration and/or recoloring in order to reduce signal degradation and ensure signal quality. Also, as mentioned above, although depicted as a point-to-point network, optical network 101 may comprise any suitable network topology for transmitting optical signals such as a ring, a mesh, and a hierarchical network topology.

Noise and signal degradation may affect the reliability of the network. Noise may occur from many sources in an optical network. For example, noise may be created by elements in the network, such as when an electrical signal is converted to an optical signal, or vice versa. Noise may occur in the optical fibers in the network due to channel interference, distortion, polarization, non-linear effects, external interference, or other effects or sources. Noise may take different forms, such as phase noise, acoustic noise, and modal noise. In addition to noise, the strength of an optical signal may lessen, or attenuate as the signal travels along the network link. Signal attenuation may be caused by dispersion, bending loss, or other factors that affect the light energy as it travels. The amount of signal attenuation may vary over time depending on, for example, the condition of the network equipment and/or the environment near the network equipment.

Recovery of the data encoded in the optical signal may become more difficult as the noise increases and/or the strength of the optical signal decreases. For example, data, such as bits (e.g., 1s and 0s), may be sent across network links in the form of optical signals encoded with the data. As the noise on a network link increases and/or the signal loses strength, the receiver may experience trouble decoding the transmitted data from the optical signals. A bit error may occur when, for example, a 0 bit transmitted by a transmitter is incorrectly perceived as a 1 bit at a receiver, or vice versa.

An optical network may use one or more techniques to correct bit errors that occur during data transmission. One such error correction technique is forward error correction (FEC). With FEC, data is encoded in a redundant manner such that a receiver may detect when a bit error occurs and recover the originally transmitted data without requiring retransmission of data from the transmitter. However, FEC may have a threshold bit error rate (BER), that when exceeded, causes the error management technique to no longer be able to recover the originally transmitted data. In such a scenario, the data may be lost and retransmission may be required. Thus, limiting the BER on an optical network link is desirable for ensuring the throughput and reliability of the network. The FEC threshold may depend on the particular method of error correction, including the amount of redundancy in the transmitted data.

One method for reducing BER in an optical network is increasing the signal-to-noise ratio (SNR). The SNR is the ratio of the signal power to the noise power. As the SNR increases, the power of the signal (the desired information representing the encoded data) increases relative to the power of the undesired noise. The SNR affects the ability of the receiver to distinguish the data encoded in the optical signal at the transmitter from the noise occurring in the network. Accordingly, the SNR may directly affect the BER in the network link. The SNR may be improved by improving the strength of the signal and/or reducing the noise in the network link.

An optical network may employ a noise margin to ensure the reliability of communications on the network. The noise margin may represent the amount of excess noise (e.g., noise beyond the actual background noise in the network) that can occur in the network link without compromising the ability to reliably communicate across the link. That is, the noise margin may maintain a BER below the threshold at which the FEC ceases to reliably perform error correction. The larger the noise margin, the lower the BER in the network link may become, and thus, the less frequently data loss (e.g., bit errors that FEC cannot detect and correct) may occur. A larger noise margin also allows for greater variation in the actual noise in the network link without data loss or corruption. Thus, a larger noise margin may prevent network outages when unexpected noise occurs in the network.

However, increasing the noise margin may cause the network equipment to operate below its full capabilities. A larger noise margin may require that an optical network link operate at a higher SNR (e.g., the SNR that meets a lower BER associated with the noise margin). Thus, the distance that an optical signal is permitted travel without amplification or regeneration, for example, may decrease. Additional equipment (e.g., optical regenerator or amplifier) or signal operations (e.g., filtering, reshaping, etc.) may be required in order to maintain the higher SNR. Similarly, various network elements may be required to reduce their data transmission rates in order to maintain a higher SNR. Thus, while the noise margin may improve communication reliability across the network link, it may have unintended consequences of limiting or reducing network performance and/or increasing the cost of the network due to added equipment and functionalities.

It may be desirable to monitor and adjust the noise margin in a network link to balance the efficient use of network resources with the communication reliability across the network link. As described above, noise in the network may vary over time as one or more conditions and/or equipment in the network change. For example, new equipment may be added to the network link and existing equipment may become more noisy with age, movement, and/or damage. Conditions at or near the equipment may also affect noise and signal strength, which in turn may affect SNR on the network link. In addition to variation in noise, other characteristics of the network link may change over time. For example, non-linear affects or other impairments to the network link may change the resulting BER for a particular amount of noise (e.g., the affects the noise has on the BER) from one time to another. Thus, the noise on the network link and the affect such noise has on the reliability of the link may change over time. By monitoring the performance of the network link across different noise levels, details may be learned about the noise and characteristics of the network link. As explained in more detail below, such information may be used to adjust the noise margin or network link to ensure continued and efficient operation of the network.

Figure 2:
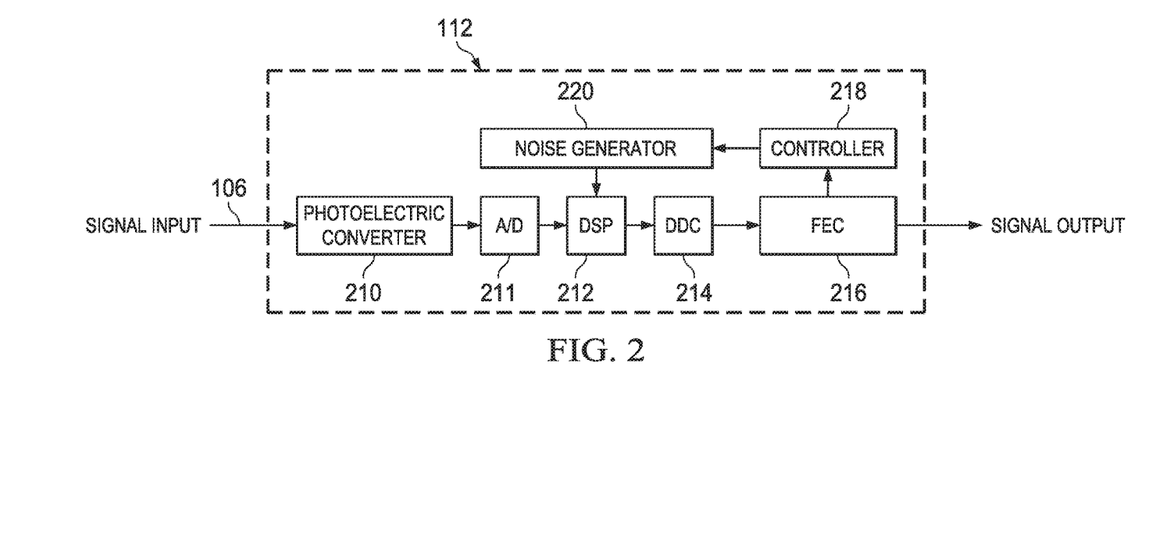
FIG. 2 illustrates a block diagram of selected elements of an embodiment of a receiver in an optical network.

FIG. 2 illustrates an exemplary receiver in an optical network. As described above with respect to FIG. 1, receiver 112 may receive an optical signal, such as an optical signal from demultiplexer 105 described above with respect to FIG. 1, as input. The optical signal may proceed to photoelectric converter 210 that converts the optical signal to an electrical signal. The analog electrical signal output from photoelectric converter 210 may be converted to a digital signal by A/D converter 211 and then processed by digital signal processor (DSP) 212. In turn, digital decision circuit (DDC) 214 may convert the output from DSP 212 into a digital stream of bits (e.g., 1s and 0s). Forward error correction (FEC) 216 may detect and correct bit errors in the digital stream before the data is sent out to devices coupled to the network.

Photoelectric converter 210 may comprise any system, apparatus or device to convert an optical signal into an electrical signal. The electrical signal produced by photoelectric converter 210 is an electrical representation of the optical signal input to the converter. For example, the amplitude of the voltage of the electrical signal may correspond to the strength of the optical signal. The electrical signal may be an analog signal that is then converted to a digital signal by A/D converter 211.

DSP 212 may perform one or more processes on the electrical signal from photoelectric converter 210. DSP 212 may be any system, apparatus or device capable of processing signals. For example, DSP 212 may be a microprocessor optimized for signal processing. DSP 212 may perform one or more processing steps on the signal to, for example, reduce noise, enhance signal strength, phase shift the signal, and/or other processing steps. As an example, DSP 212 may filter, square, and/or shift the phase of the signal before it is converted into a digital stream of bits. Such processing steps may help enhance the signal strength and/or remove noise to help improve the SNR.

The output from DSP 212 may be sent to DDC 214 to convert the processed signal into a digital stream of bits. DDC 214 may be any system, apparatus or device capable of converting an encoded electrical signal into a digital stream of bits. DDC 214 may analyze the processed signal from DSP 212 to estimate (e.g., based on the actual or expected frequency, phase, amplitude, or the properties of the signal) whether each portion of the signal corresponds with a logic high value (e.g., a 1 bit) or a logic low value (e.g., a 0 bit). The output from DDC 214 is a digital stream of bits representative of the input signal at receiver 112.

As discussed above, noise and/or signal strength may affect the ability to correctly interpret data at the receiver. Some portions of a signal may be incorrectly interpreted as a 1 or 0 by DDC 214. FEC 216 may analyze the digital stream of bits from DDC 214 to detect and correct such errors. FEC 216 may rely on redundancy in the data transmitted. For example, FEC 216 may look to one or more other bits (e.g., a repeated bit and/or a parity bit) in the digital stream to determine whether a particular bit is correct or should be changed from or to a 1 bit or a 0 bit. The data sent across the network link may use any suitable method of error management, including, for example, block codes, convolutional codes, cyclic codes, turbo codes, concatenated codes, and low-density parity-check.

When the BER is within the FEC threshold, the output of FEC 216 may represent the data transmitted from the transmitter (e.g., transmitter 102 described above with respect to FIG. 1) without any errors. FEC 216 may propagate the error-free output signal to one or more devices coupled to the receiver. However, in some scenarios, the BER in the digital stream may exceed the FEC threshold such that FEC 216 may not be able to correct the bit error. In such a scenario, one or more portions of the data sent from the transmitter may be lost and require retransmission to receiver 112. Such data loss may affect the reliability of the network link, and in some cases, cause a network outage.

To ensure the continued and efficient operation of the network, receiver 112 may include one or more components to select and implement a noise margin on a network link. Receiver 112 may include controller 218 and noise generator 220 to create a feedback control loop in receiver 112. Noise generator 220 may communicably couple to FEC 216 such that the controller can monitor the BER at receiver 112. For example, FEC 216 may report bit errors to controller 218 as they occur or FEC 216 may report a bit error count over a period of time. Controller 218 may adjust the amount of noise generated by noise generator 220 based on the measured BER. The noise from noise generator 220 is in turn injected into the signal stream at DSP 212, which may affect the BER as calculated by FEC 216. This feedback loop may be used to determine an optimal noise margin for the network link in real time while not interfering with the communication on the network link.

Noise generator 220 may produce two distinct levels of noise, noise levels sA and sB. The noise generated by noise generator 220 may be randomized noise, such as white noise. Controller 218 may control whether noise generator 220 injects level sA or sB amount of noise into the data stream at DSP 212. Controller 218 may select between noise levels sA and sB, as discussed in more detail below.

Modifications, additions or omissions may be made to receiver 112 without departing from the scope of the disclosure. For example, receiver 112 may include more or fewer elements than those depicted in FIG. 1. In addition, one or more of the elements in receiver 112 may be rearranged, combined, and separated into multiple elements. For example, noise generator 220 may be configured to inject noise at A/D 211, photoelectric converter 210, input fiber 106, and/or another location within receiver 112.

Figure 3:
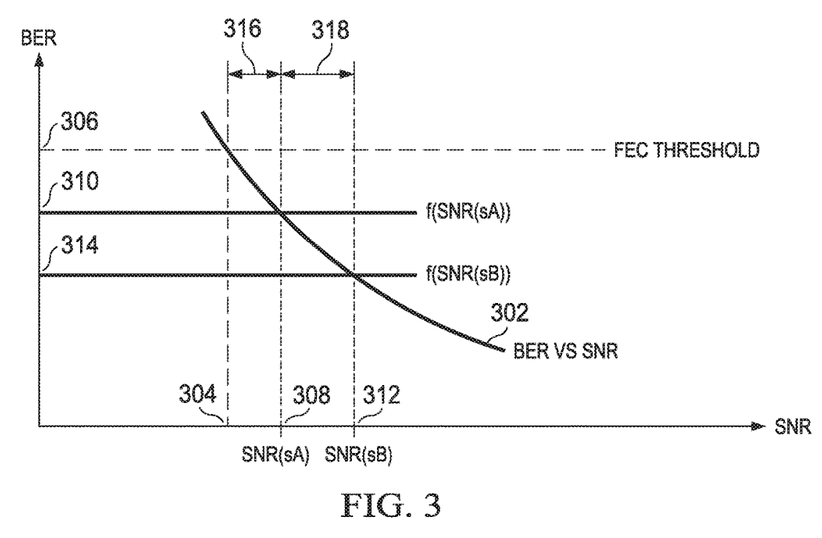
FIG. 3 is a graph illustrating the relationship between the bit error rate and signal-to-noise ratio on a network link.

FIG. 3 is graph illustrating the relationship between the BER and SNR on a network link. Curve 302 illustrates how the SNR on a network link may affect the BER on the link. As the SNR increases, the power of the desired signal increases relative to the power of the undesired noise. Thus, the transmitted data (e.g., the desired signal) is more easily distinguishable from the noise as the SNR increases, thereby decreasing the BER. At SNR 304, the BER on the network link crosses BER 306, corresponding with the FEC threshold, the maximum BER at which the FEC can detect and correct bit errors.

Non-linear effects, such as polarization, or other impairments on the network link may cause curve 302 to change over time. Such impairments may occur at any time, and could cause rapid changes to the network link that cause curve 302 to change shape or shift. Monitoring the BER at noise levels sA and sB may indicate when curve 302 is experiencing variations due to non-linear effects and/or other impairments. As discussed in more detail below with respect to FIG. 4, the BER may be measured at noise level sA and sB over time such that changes to curve 302 may be detected. Thus, using two levels of noise (e.g., noise levels sA and sB) may provide insight into the relationship between the SNR and the BER on the network link that in turn may be use to select an appropriate noise margin for the network link and/or detect when changes to the network link are needed.

Noise levels sA and sB may create two noise margins on the network link. Adding higher noise level sA to the data stream results in SNR 308. SNR 308 corresponds with BER 310, the BER when noise level sA is added to the data stream at the receiver (e.g., the combined noise of noise level sA and the background noise in the network link). Adding lower noise level sB to the data stream results in SNR 312. SNR 312 corresponds with BER 314, the BER when noise level sB is added to the incoming data stream at the receiver. SNR 304 corresponds with the FEC threshold, BER 306. SNRs 304, 308, and 312 correspond with noise margins 316 and 318. For example, noise margin 316 represents the noise margin between SNR 308 and SNR 304, or the increase in SNR (e.g., from added noise or signal attenuation) that may occur before the FEC threshold is met. Noise margin 318 corresponds with the margin between SNR 308 and SNR 312, the SNRs corresponding with the two noise levels sA and sB, respectively.

Noise margins 316 and 318 may represent a dynamic noise margin and a fixed noise margin, respectively. As explained above, non-linear effects and/or other impairments on the network link may cause shifting or reshaping of curve 302. Such changes to curve 302 may occur over time, dynamically changing noise margin 316 as the curve changes shape and/or shifts. For example, the permitted decrease in SNR (e.g., from added noise or signal attenuation) at noise level sA before the FEC threshold is met (e.g., noise margin 316) may increase or decrease as curve 302 changes over time. Thus, noise margin 316 may change over time due to changes on the network link. By contrast, noise margin 318 (e.g., the noise margin between noise level sA and noise level sB) may represent a relatively fixed noise margin when noise levels sA and sB are fixed. That is, changes to the network link (e.g., changes to curve 302) may have little effect on the noise margin between noise levels sA and sB as compared to the changes to noise margin 316.

Noise levels sA and sB may be used to ensure the continued and efficient operation of the network. Noise level sA may be set as a stable reference point for noise margin monitoring. Noise level sA may be selected to minimize noise margin 316, while still maintaining the reliability of the link. For example, a higher noise level sA may cause SNR 308 to be in close proximity to SNR 304 (e.g., smaller noise margin 316), and a lower noise level sA may create an SNR 308 farther from SNR 304 (e.g., larger noise margin 316). Decreasing noise margin 316 may limit the network link's reliability as conditions on the network link change over time, which in turn could shift or reshape curve 302 such that the FEC threshold is exceeded when noise level sA is added to the data stream. To illustrate, setting noise level sA too high may result in an SNR that exceeds the FEC threshold. Noise level sB may be selected to control noise margin 318 (e.g., the noise margin between noise levels sA and sB) and provide an approximately fixed noise margin 318 below the FEC threshold.

Noise levels sA and sB may be adjusted as needed over time to achieve desired noise margins on a particular network link. For example, when initializing a receiver, noise levels sA and sB may be originally set to 0 (e.g., no added noise at the receiver). Noise level sA may be increased to a desired noise margin (e.g., noise margin 316) corresponding with a BER below the FEC threshold by a desirable amount. In some embodiments, noise level sA may be increased to a level that results in a BER between approximately $10^{-5}$ and $10^{-6}$. Noise level sA may be the only noise added by the noise generator during the initialization stage. Next, noise level sB may be set to the value of noise level sA and then slowly reduced until a desired noise margin (e.g., noise margin 318) is achieved. During the variation of noise level sB, the duty cycles of noise levels sA and sB may be kept approximately constant by the controller. After noise level sB is set, noise levels sA and sB may be further adjusted as needed to obtain the desired noise margins 316 and 318. If the desired noise margin 318 cannot be obtained by adjusting noise level sB (e.g., noise level sB reaches 0, or no added noise), then the noise levels may require re-initialization. As explained below, monitoring the BERs for noise levels sA and sB may provide insight into the relationship between the SNR and the BER on the network link and how this relationship changes over time. Such information may be used to approximate the shape of curve 302 (e.g., by linear interpolation or another suitable method) such that noise levels sA and sB may be selected without resulting in a BER that exceeds FEC threshold, BER 306.

In some embodiments, noise level sA may be set by a central control unit communicably coupled to the receiver. In some embodiments, noise level sB may be controlled by the local controller at the receiver (e.g., controller 218 described above with respect to FIG. 2) or another system, apparatus or device coupled to the network link. In certain embodiments, noise level sA and noise level sB may be selected such that BER 310 and BER 312 are between one and two orders of magnitude different. Other methods may be used to select the values of noise levels sA and sB without deviating from the scope of the present invention.

Under normal operating conditions, the controller of the receiver may switch between noise levels sA and sB in the manner described below.

Figure 4:
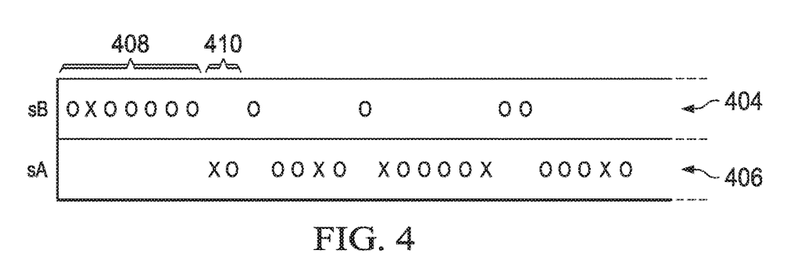
FIG. 4 illustrates an exemplary digital stream with bit errors over two levels of added noise.

FIG. 4 illustrates exemplary digital stream with bit errors over two levels of added noise. An "X" symbol corresponds with the occurrence of a bit error, and an "O" symbol corresponds with no bit error, or a correctly received bit. The determination of a bit error may be made using FEC according to the methods described above with respect to FIG. 2 or another suitable error correction technique.

The BER may be calculated from the number of bit errors over a period of time. For example, the total number of bit errors (e.g., "X") in a period may be divided by the total number of bits (e.g., "O" and "X") received in the same period to produce the BER for that particular period. The BER may be calculated over a fixed or a variable period. As an example, the BER may be calculated over a sliding window representing a fixed number (e.g., 20) of the most recent bits. As another example, the BER may be calculated from an increasing period representing a running average in which the period is incremented for each bit received. As yet another example, the BER may be calculated over one or more non-contiguous periods of time, as described in more detail below.

In some embodiments, more than one BER may be calculated concurrently. For example, a BER may be calculated for noise level sA and/or noise level sB in addition to the BER for the overall network link (e.g., the BER when either noise level sA and/or noise level sB are interchangeably added at the receiver). That is, a BER may be calculated for noise level sA based on the bits received when noise level sA is added at the receiver. The BER for noise level sA may be calculated from, for example, the number of bit errors over the total number of bits received during one or more periods of time when noise level sA is applied at the receiver. In some instances, the BER calculation for noise level sA may run over one or more non-contiguous periods of time (e.g., the periods in which noise level sA is added at the receiver may be separated by one or more periods in which noise level sB is added at the receiver). Another BER may be calculated for noise level sB in a similar manner. Concurrently, a BER may be calculated for the overall network link when noise levels sA and sB are interchangeably added at the receiver. The BERs for noise levels sA and sB may correspond with the BER when the particular noise level is added at the receiver. One or more of the measured BERs may be used to determine a characteristic of the network link. For example, the BER of noise level sA and the BER of noise level sB may be used to determine the relationship between BER and SNR on the network link (e.g., the slope and placement of curve 302 in FIG. 3) at a given time.

As explained above, the controller at the receiver (e.g., controller 218 described above with respect to FIG. 2) may add noise to the incoming data stream in order to maintain and control a noise margin for the network link. The controller may add noise at either noise level sA or noise level sB. The controller may toggle or switch between the added noise levels to maintain a target BER. The target BER may be set to any value below the FEC threshold. In some embodiments, the target BER may be set to a BER corresponding with the addition of noise levels sA and sB at equal duty cycles at a particular point in time (e.g., the SNR when noise levels sA and sB are added to the input data stream at the same duty cycle).

In FIG. 4, row 404 corresponds with lower noise level sB and row 406 corresponds with higher noise level sA. During period 408, lower noise level sB is added to the data stream and only a single bit error occurs in the nine bits processed. Thus, the BER during period 408 may decline below the target BER due to the infrequent occurrence of bit errors. In period 410, the controller may transition to higher noise level sA in order to increase the BER closer to the target BER. The higher noise level sA causes a bit error to occur in period 410, thereby increasing the BER. The controller may continue to switch between noise levels sA and sB in order to maintain the measured BER at or near the target BER. In this manner, the controller may switch between the two noise levels (e.g., by adjusting the period and/or duty cycle at each level) in order to maintain a target BER. In some embodiments, the controller may implement a minimum period (e.g., 2 bits) at each noise level to reduce the frequency of the switching between noise levels sA and sB and/or control the BER variation.

The controller at the receiver may monitor various characteristics of the network link from the duty cycles of the two noise levels. For example, extended periods of the lower noise level sB may correspond with a decrease in the noise margin for the network link, and extended periods of the higher noise level sA may correspond with an increase in the noise margin for the network link. Changes in the noise margin may be the result of background noise on the network link and other changes in the relationship of the BER and SNR on the network link (e.g., caused by non-linear effects or other impairments). However, because the relationship of the BER and SNR on the network link (e.g., curve 302 in FIG. 3) may change over time, it may be difficult to distinguish between changes in background noise on the network link and other factors. The BERs for noise level sA and noise level sB, discussed above with respect to FIG. 3, may provide insight into the relationship of the BER and SNR on the network link. For example, the BER for noise level sA and the BER for noise level sB may correspond with points on curve 302 in FIG. 3, such that the approximate slope of curve 302 may be determined. Similarly, the BER for noise level sA or sB may be used in combination with the overall BER to provide similar information. If the slope of curve 302 remains approximately constant over the same period of time in question, then changes in the noise margin is likely the result increased background noise on the network link or decreased signal strength. By contrast, if the slope of curve 302 changes over time, then the increased noise is more likely the result of non-linear changes in the relationship between the SNR and the BER on the network link. Thus, the controller may use the periods and/or duty cycles of injected noise levels sA and sB and/or the BERs at the different noise levels to identify changes in the background noise or other impairments in the network link.

Figure 5:
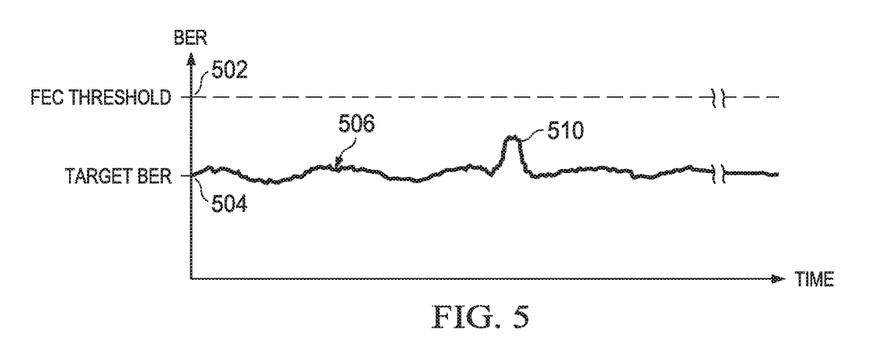
FIG. 5 is a graph illustrating the bit error rate of an exemplary network link over time.

FIG. 5 is graph illustrating the BER of an exemplary network link over time. BER 502 represents the FEC threshold. BER 504 represents the target BER below BER 502 as described above with respect to FIG. 3. That is, BER 504 represents the target BER that the controller (e.g., controller 218 described above with respect to FIG. 2) in the receiver will attempt to maintain.

Plot 506 illustrates the measured BER on the network link. The measured BER may represent the BER measured by the FEC from the input signal with injected noise from the controller and noise generator. As illustrated, the measured BER remains relatively close to target BER 504. The controller may adjust the amount of noise added to the data stream (e.g., by adjusting the occurrence of noise levels sA and sB) in order to maintain the BER at or near target BER 504.

However, at time 510, the measured BER may experience a larger deviation from target BER 504. Leading up to time 510, the controller at the receiver may attempt maintain the target BER 504 by decreasing the duty cycle of higher noise level sA and increasing the duty cycle of lower noise level sB. Despite such changes to the injected noise, the measured BER may continue to deviate from target BER 504. Thus, the deviation from target BER 504 at time 510 may correspond with a decreased duty cycle (e.g., less than approximately 10%) of higher noise level sA and an increased duty cycle of lower noise level sB (e.g., more than approximately 90%).

An abnormal deviation from target BER 504 as illustrated in plot 506 may represent a change in the conditions of the network link. For example, the relationship of the SNR to the BER for the network link (e.g., plot 302 described above with respect to FIG. 3) may shift and or change shape due to, for example, non-linear effects or other impairments in the network link. The abnormal condition may correspond with an increased occurrence of lower noise level sB (e.g., increased duty cycle of noise level sB to try and maintain the target BER). In response to an abnormal deviation from target BER 504, the controller in the receiver may issue a warning to the system administrator and/or network controller. The controller may also take action by, for example, adjusting the power of the light source on the optical link or modifying another setting associated with the network link to adjust the SNR to provide an increased system margin. Such a change in conditions of the network link may be identified by a deviation in the BER from target BER 504 as described above, and/or by an change in the duty cycle of the noise levels sA and sB as described above with respect to FIG. 3. For example, if the duty cycle for lower noise level sB becomes too high (e.g., such that higher noise level sA is not occurring or occurring infrequently), then this may represent a changed in the background noise or conditions in the network link. Although abnormal deviation illustrated in plot 506 exceeds the target BER, the deviation could occur below the target BER. For example, if higher noise level sA increases in duty cycle and the measured BER falls below the target BER, then this could indicate that the system margin is not optimal (e.g., too high a margin), and adjustment is needed.

Figure 6:
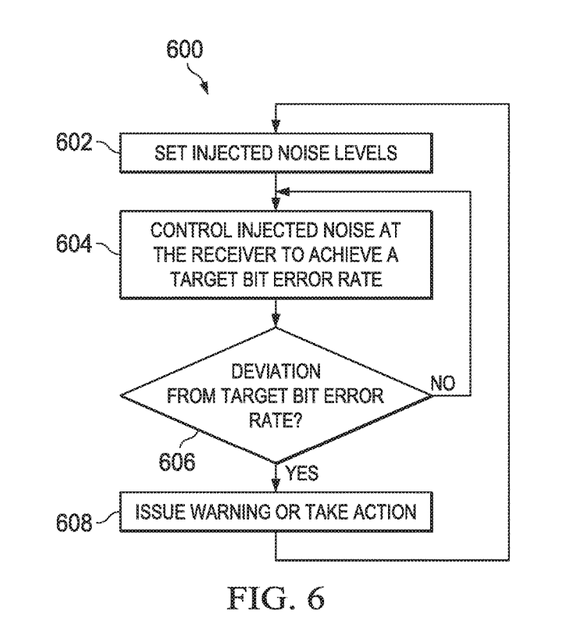
FIG. 6 is a flow chart of selected elements of a method for monitoring and controlling a noise margin in an optical network.

Referring now to FIG. 6, a block diagram of selected elements of an embodiment of method 600 for monitoring and controlling a noise margin in an optical network. Method 600 may be performed using one or more elements in optical transport network 101 described above with respect to FIG. 1. Although method 600 is described for a single network link, operations in method 600 may be repeated or duplicated, for any plurality of network links in an optical network. It is noted that certain operations described in method 600 may be optional or may be rearranged in different embodiments.

Method 600 may begin at step 602 by setting the injected noise values of the network link. Noise levels sA and sB may be set to create two noise margins on the network link as described above with respect to FIG. 3. For example, at initialization of the receiver, the noise level sA may be adjusted from 0 to a noise level that creates a desired noise margin from the FEC threshold, and noise level sB may then be adjusted to create a desired noise margin between noise levels sA and sB. The noise may be injected at the receiver using a controller and a noise generator as described above with respect to FIG. 2.

At step 604, the noise injected at the receiver may be controlled to achieve a target BER. As described above with respect to FIG. 3, the controller of the receiver may control the duty cycles and/or the periods of the added noise (e.g., switching between noise levels sA and sB) in order to maintain the target BER. The target BER may be less than the FEC threshold. The FEC at the receiver may measure the BER over a fixed or variable period, as described above with respect to FIG. 3. The FEC may communicate the BER measurements to a controller that adjusts a noise generator, creating a feedback loop as illustrated in FIG. 2.

At step 606, a determination may be made as to whether a deviation from the target BER has occurred. Despite the controlling of the noise injected at the receiver, the controller may not be able to maintain the measured BER at the target BER. An abnormal variation from the target BER may occur caused by, for example, a shift and/or a change in the relationship between the SNR to the BER. The abnormal variation may be detected from the measured BER and/or the duty cycles of the added noise levels. For example, abnormal variation may correspond to the duty cycle of noise level sA deviating from the duty cycle of noise level sB by more than a predetermined threshold (e.g., when the duty cycle of either noise level approaches approximately 90%), or vice versa. When the result of step 606 is NO and the measured BER does not abnormally vary from the target BER, method 600 may return back to step 604 to continue to control the injected noise at the receiver to maintain the target BER.

When the result of step 606 is YES and an abnormal variation from the target BER does occur, method 600 may proceed to step 608. At step 608 a warning may be issued or an action may be taken. As explained above, an abnormal variation from the target BER may be caused by a shift and/or change shape of relationship between the SNR to the BER for the network link due to changes in the background noise or conditions in the network. The controller may also take action by, for example, changing a setting and/or characteristic of the network link to adjust the relationship of the SNR to the BER for the network link. In some embodiments, the noise margins may be adjusted as described above with respect to FIG. 3 based on the changes made to the network link. In certain embodiments, the controller at the receiver may temporarily shut down the network link by communicating with a centralized network controller that may divert network traffic to other network links. Thus, network communication may continue while changes and/or repairs are made to the affected network link. After step 608, method 600 may proceed to step 602 to reset the injected the noise levels.

As disclosed herein, methods and systems for constellation shaping of modulation formats in optical communication systems may involve enabling an optical transport network to activate/deactivate constellation shaping on a per channel basis for a given optical path using universal programmable transceivers. Then, constellation shaping may be activated to increase the reach of optical channels by improving signal-to-noise ratio over the optical path.

While the subject of this specification has been described in connection with one or more exemplary embodiments, it is not intended to limit any claims to the particular forms set forth. On the contrary, any claims directed to the present disclosure are intended to cover such alternatives, modifications and equivalents as may be included within their spirit and scope.

What is claimed is:

1. A method for monitoring a network link in an optical transport network, the method comprising:
    injecting a first level of added noise to the data stream at the receiver for a first period;
    calculating a first bit error rate (BER) for the first period;
    injecting a second level of added noise to the data stream at the receiver for a second period, the second level of added noise different than the first level of added noise, wherein the first and second periods do not overlap;
calculating a second BER for the second period; and
determining a characteristic of the network link based on the first BER and the second BER.

2. The method of claim 1, wherein the steps of injecting the first level of added noise and injecting the second level of added noise are repeated for a third period.

3. The method of claim 2, further comprising calculating a third BER for the third period.

4. The method of claim 3, further comprising modifying the first period and the second period to adjust the third BER to a target BER, wherein the target BER is below a forward error correction threshold of the network link.

5. The method of claim 4, further comprising taking an action when the first period exceeds the second period by a predetermined threshold.

6. The method of claim 5, wherein the action comprises issuing a warning.

7. The method of claim 5, wherein the action comprises adjusting the SNR on the network link.

8. The method of claim 1, wherein the characteristic of the network link is a relationship between an SNR and a BER of the network link.

9. The method of claim 8, further comprising adjusting a noise margin for the network link based on the characteristic of network link.

10. The method of claim 9, wherein the noise margin corresponds to the first level of added noise and the second level of added noise.

11. A receiver in an optical transport network, the receiver comprising:
a noise generator; and
a controller coupled to the noise generator, the controller configured to:
direct the noise generator to inject a first level of added noise to a data stream for a first period, the data stream comprising data received over a network link;
calculate a first bit error rate (BER) for the first period;
direct the noise generator to inject a second level of added noise to the data stream for a second period, the second level of added noise different than the first level of added noise, wherein the first and second periods do not overlap;
calculate a second BER for the second period; and
determine a characteristic of the network link based on the first BER and the second BER.

12. The receiver of claim 11, wherein the controller repeats the directing of the noise generator to inject the first level of added noise and the second level of added noise for a third period.

13. The receiver of claim 12, wherein the controller is further configured to calculate a third BER for the third period.

14. The receiver of claim 13, wherein the controller is further configured to modify the first period and the second period to adjust the third BER to a target BER, wherein the target BER is below a forward error correction threshold of the network link.

15. The receiver of claim 14, wherein the controller is further configured to take an action when the first period exceeds the second period by a predetermined threshold.

16. The receiver of claim 15, wherein the action comprises issuing a warning.

17. The receiver of claim 15, wherein the action comprises adjusting the SNR on the network link.

18. The receiver of claim 11, wherein the characteristic of the network link is a relationship between an SNR and a BER of the network link.

19. The receiver of claim 18, wherein the controller is further configured to adjust a noise margin for the network link based on the characteristic of network link.

20. A method for monitoring a network link in an optical transport network, the method comprising:
injecting a first level of added noise to the data stream at the receiver for a first period;
calculating a first bit error rate (BER) for the first period;
injecting a second level of added noise to the data stream at the receiver for a second period, the second level of added noise different than the first level of added noise, wherein the first and second periods do not overlap;
calculating a second BER for a third period, the third period including the first and second period; and
determining a characteristic of the network link based on the first BER and the second BER.

* * * * *